United States Patent [19]

McCarthy

[11] Patent Number: 4,840,387
[45] Date of Patent: Jun. 20, 1989

[54] SELF-ACTUATING KEYLESS CHUCK

[75] Inventor: Donald J. McCarthy, Wethersfield, Conn.

[73] Assignee: The Jacobs Manufacturing Company, Bloomfield, Conn.

[21] Appl. No.: 146,279

[22] Filed: Jan. 20, 1988

[51] Int. Cl.$^4$ ............................ B23B 5/22; B23B 5/34
[52] U.S. Cl. ...................................... 279/1 K; 279/61
[58] Field of Search ................... 279/1 K, 60, 61, 62

[56] References Cited

U.S. PATENT DOCUMENTS

| | | | |
|---|---|---|---|
| 4,260,169 | 4/1981 | Hall | 279/62 |
| 4,423,881 | 1/1984 | Whitehead | 279/62 |
| 4,526,497 | 7/1985 | Hatfield | 279/1 K X |
| 4,669,932 | 6/1987 | Hartly | 279/1 K X |
| 4,682,918 | 7/1987 | Palm | 279/1 K X |

Primary Examiner—Eugene R. LaRoche
Assistant Examiner—Nathan W. McCutcheon
Attorney, Agent, or Firm—Donald E. Degling

[57] ABSTRACT

A self-actuating keyless chuck for use with a reversible powered driver is disclosed. The chuck comprises a body which carries a rotatable split nut and a plurality of slidable jaws driven by the rotatable nut. A sleeve member is rotatably connected to the body and carries an impact ring provided with a first impact dog. A second impact dog is associated with the split nut. Spring means are provided to bias the first impact dog toward engagement with the second impact dog whereby the jaws will be tightened or loosened whenever the rotation of the sleeve is restrained and the powered driver is actuated.

17 Claims, 5 Drawing Sheets

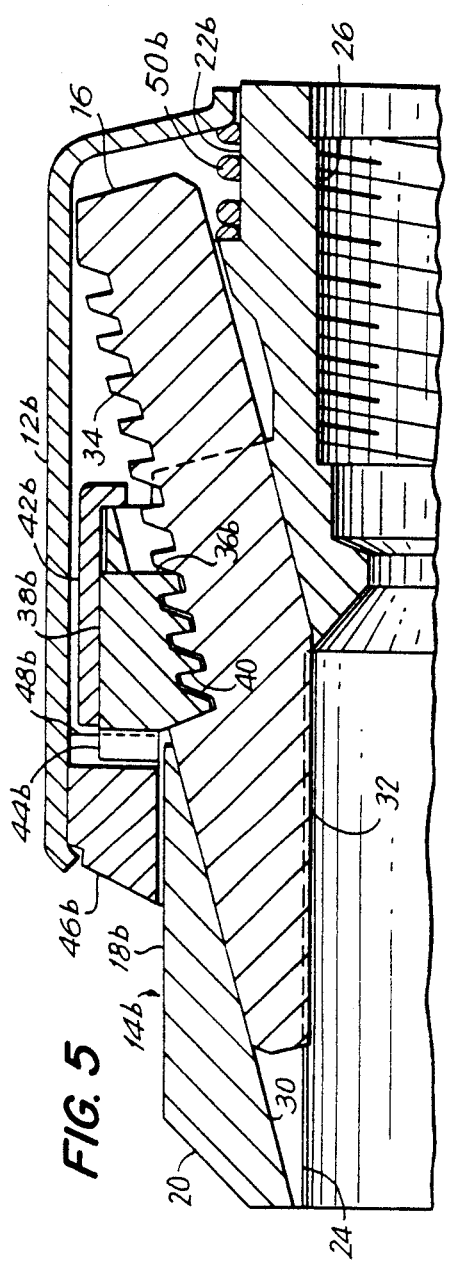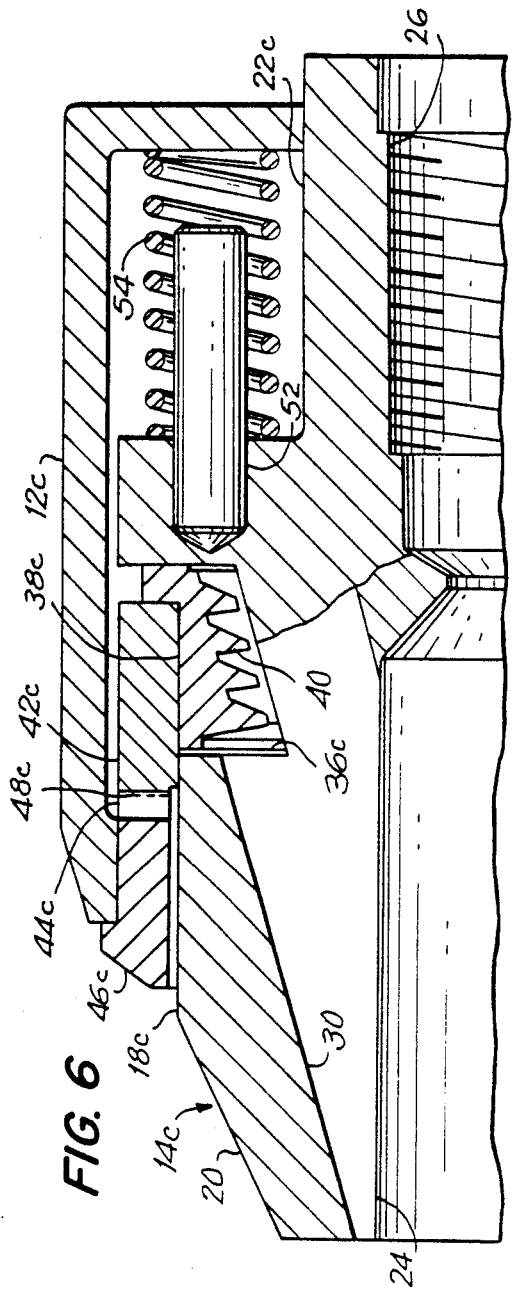

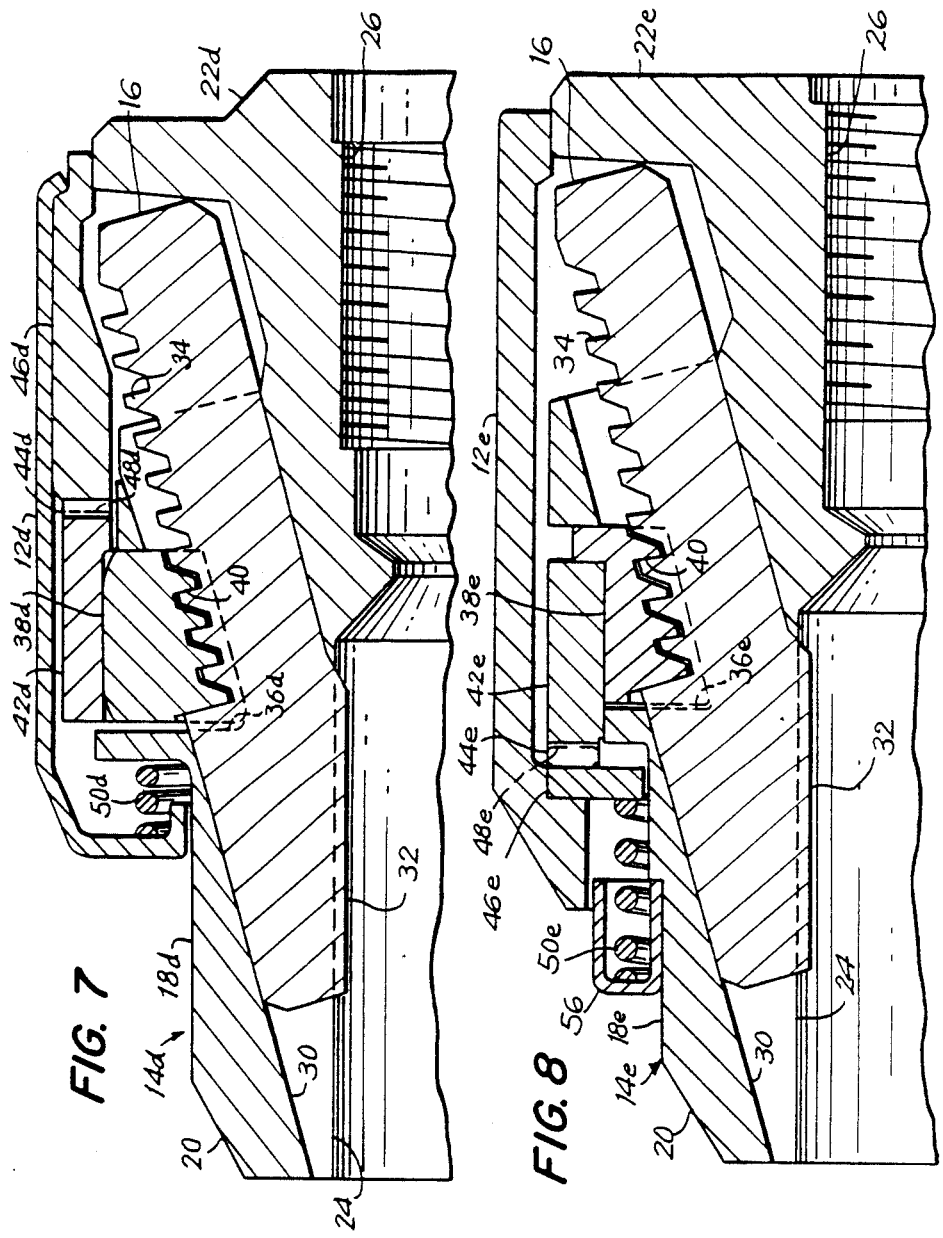

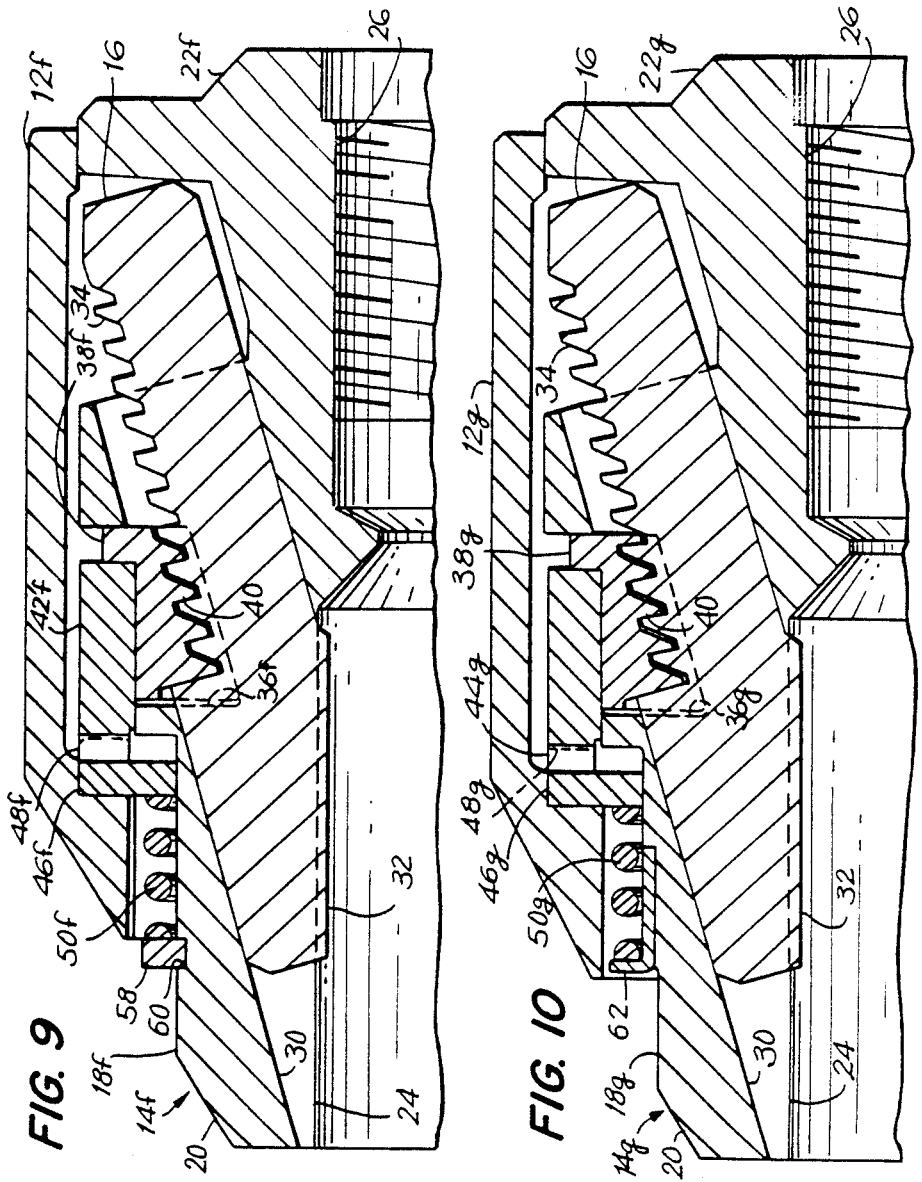

SELF-ACTUATING KEYLESS CHUCK

BACKGROUND OF THE INVENTION

1. Field of the Invention

The invention relates to drill chucks for use with electric or pneumatic power drills. More particularly it relates to a chuck of the keyless type which is tightened or loosened by actuation of the drill motor.

2. Prior Art

Electric or pneumatic power tools are commonly provided with tool holders or chucks intended to grip the shank of a tool, such as a drill bit. Usually, the tool holder or chuck is formed with an axial threaded hole adapted to engage the threaded end of the drive shaft of the power tool. Alternatively, the tool holder or chuck may have an axial tapered hole which mates with a tapered drive shaft of the power tool.

A wide variety of chucks has been developed by the art. In the simplest form of chuck three jaws spaced 120° apart from each other are constrained by a conical body threaded onto the drive shaft so that rotation of the body in one direction relative to the drive shaft forces the jaws into gripping relationship with respect to the cylindrical shank of a tool while rotation in the opposite direction releases the gripping relationship. Such a chuck may be a keyless chuck if the body is rotated by hand. However, because the tightening or loosening torque which may be applied directly in a hand operation is limited, the art developed the so-called three jaw geared chuck. This design overcomes the principal problems in the earlier design by providing guideways in the chuck body to control accurately the motion of the jaws and teeth on the jaws which mesh with a gear driven nut mounted on the chuck body. The gear is actuated by a pinion formed on a separate key which may be rotated in a bearing hole formed in the chuck body.

While the three jaw geared chuck is capable of high precision and can exert a considerable gripping force on the tool, it is relatively expensive to manufacture. In addition, the operating key may easily be misplaced and the hand operation required for chucking and unchucking a tool is time consuming.

In order to overcome these perceived disadvantages of the three jaw geared chuck, a number of designs have been proposed in which means are provided to restrain a portion of the chuck while applying power to rotate the drive shaft in a forward or reverse direction. Such relative motion produces a tightening or loosening operation. Stoner U.S. Pat. No. 2,684,856, Hall U.S. Pat. No. 4,260,169 and Whitehead U.S. Pat. No. 4,423,881 disclose keyless chucks in which the outer sleeve of the chuck is held against rotation while the drive shaft is power driven to tighten or loosen the chuck. Moeller U.S. Pat. No. 4,085,337 provides a gear driven mechanism for opening and closing the chuck jaws. The use of dog impact mechanisms appears in Rowe U.S. Pat. No. 2,716,555, Kilberis U.S. Pat. No. 4,277,074, Welch U.S. Pat. No. 4,317,578, Rohlin U.S. Pat. No. 4,358,230, Hatfield U.S. Pat. No. 4,526,497 and Hatfield U.S. Pat. No. 4,536,113. Another approach involves the use of a brake mechanism in which a sleeve or a band is tightened against the chuck sleeve to restrain its movement. This approach appears in Eberhardt U.S. Pat. No. 4,323,324, Sivertson U.S. Pat. No. 4,460,296 and Whitehead U.S. Pat. No. 4,575,108. Finally, the use of a lever or a dog to hold the chuck sleeve stationary is shown in Coder U.S. Pat. No. 4,389,146, Clarey U.S. Pat. No. 4,395,170 and Glore U.S. pat. No. 4,498,682.

SUMMARY OF THE INVENTION

In accordance with the present invention, a keyless chuck of the three jaw type is provided in which a sleeve having impact members is biased toward mating impact members associated with a rotatable nut. The nut, in turn, drives the jaw members against, or away from, a tool shank. Due to the biasing of the sleeve, chucking or unchucking may be accomplished by applying a torque opposite to the direction of rotation of the chuck. No axial force is required.

DESCRIPTION OF THE DRAWINGS

Further objects and advantages of the invention will become apparent from the following detailed description and the accompanying drawings in which:

FIG. 3 is a transverse cross-sectional view taken along lines 3—3 of FIG. 2;

FIG. 5 is a fragmentary longitudinal cross-sectional view of a second modification of the present invention;

FIG. 6 is a fragmentary longitudinal cross-sectional view of a third modification of the present invention;

FIG. 7 is a fragmentary longitudinal cross-sectional view of a fourth modification of the present invention;

FIG. 8 is a fragmentary longitudinal cross-sectional view of a fifth modification of the present invention; and FIG. 9 is a fragmentary longitudinal cross-sectional view of a sixth modification of the present invention.

FIG. 10 is a fragmentary longitudinal cross-sectional view of a seventh modification of the present invention.

DETAILED DESCRIPTION OF THE INVENTION

Figure 1:
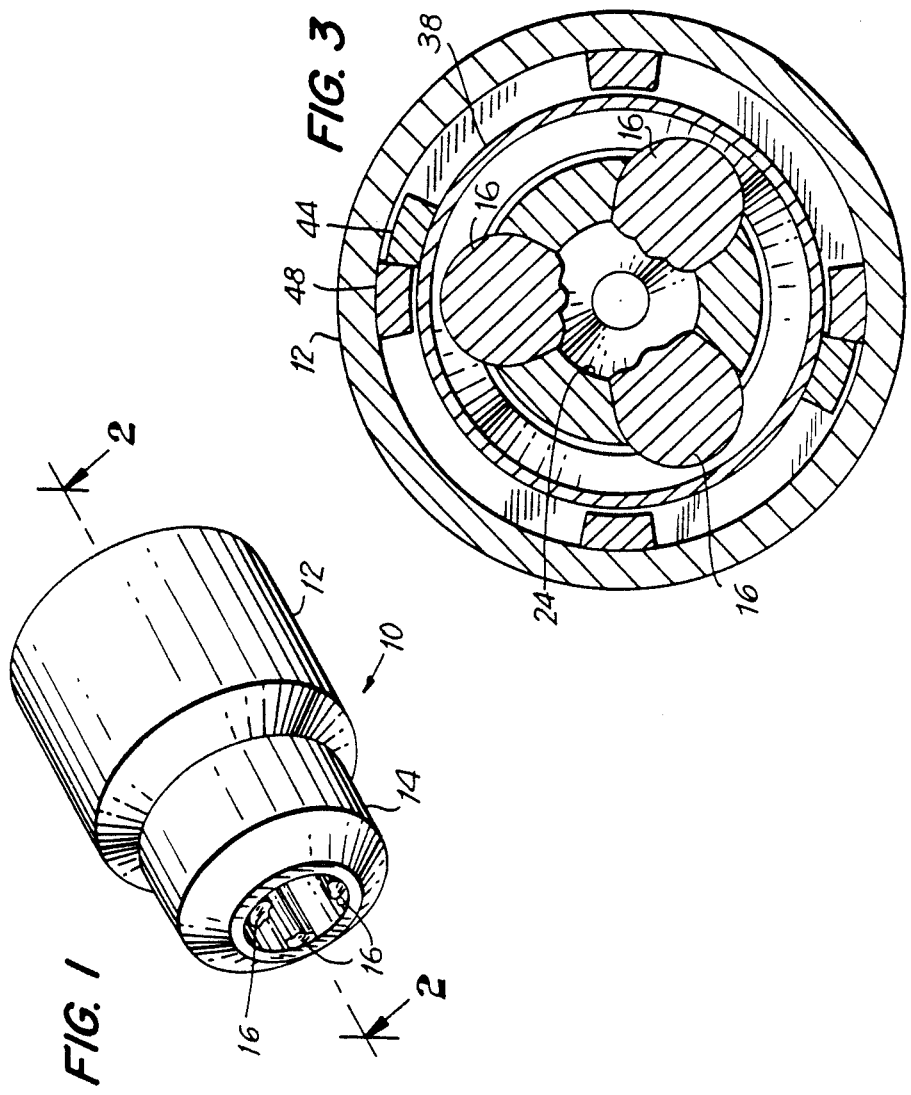
FIG. 1 is a perspective view of a keyless chuck in accordance with the present invention.

Referring now to FIG. 1, there is illustrated a chuck 10 in accordance with the present invention. The chuck 10 includes a sleeve member 12, a body member 14 and a plurality of jaw pieces 16.

Figures 2, 4:
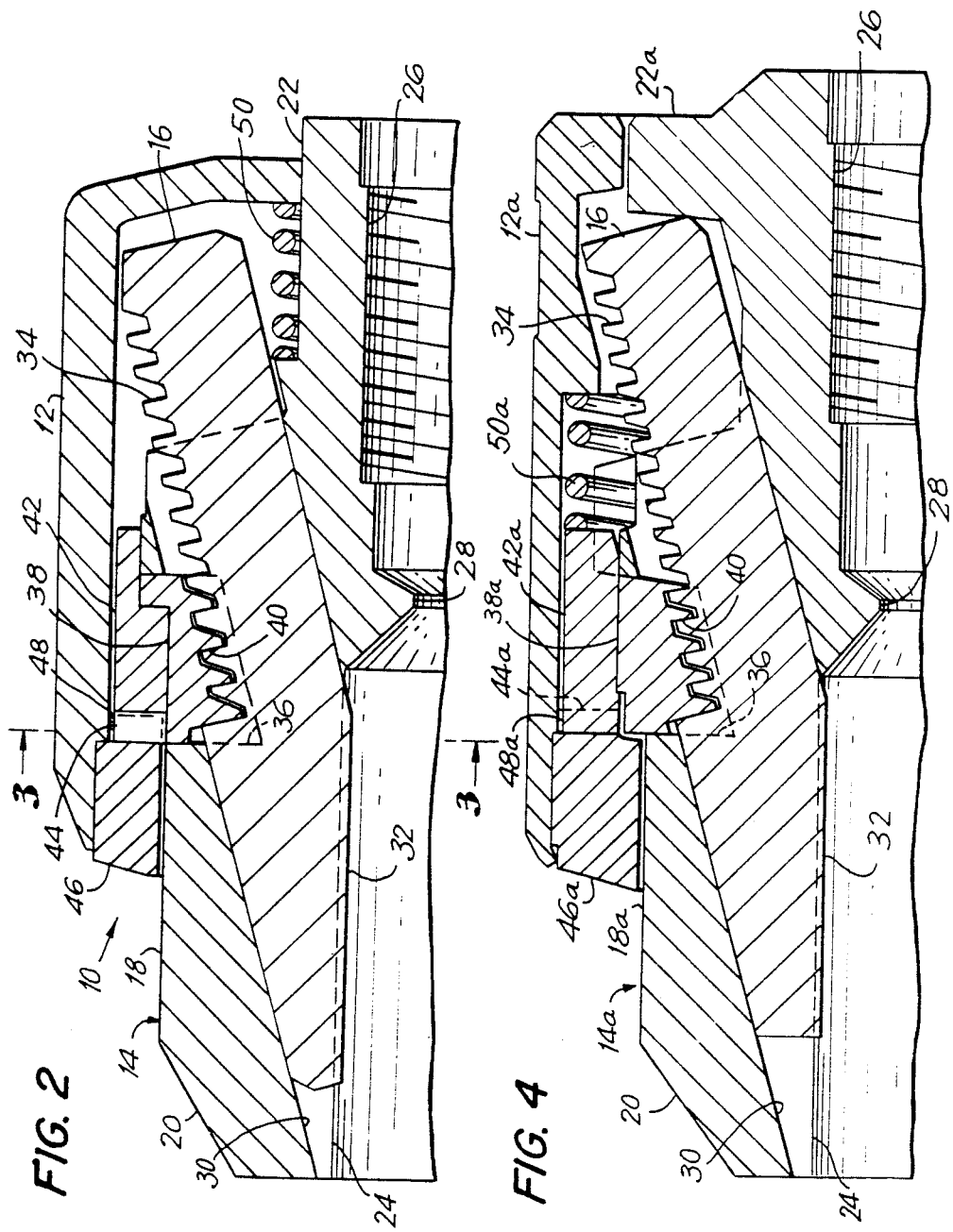
FIG. 2 is an enlarged fragmentary longitudinal cross-sectional view of a chuck in accordance with the present invention taken along line 2—2 of FIG. 1.
FIG. 4 is a fragmentary longitudinal cross-sectional view of a first modification of the present invention.

A fragmentary longitudinal cross-section of the chuck is shown in FIG. 2. The body member 14 comprises a nose or forward section 18, which preferably is chamfered at its outer end 20, and a tail or rearward section 22. An axial bore 24 is formed in the nose section 18 of the body member 14. Bore 24 has a diameter slightly larger than the largest tool shank which the chuck is designed to accommodate. A threaded bore 26 is formed in the tail section 22 of the body and is of a standard size to mate with the drive shaft of a powered driver (not shown). The bores 24, 26 may communicate at the central region 28 of the body member 14. If desired, the threaded bore 26 may be replaced by a tapered unthreaded bore of a standard size to mate with a tapered drive shaft.

Passageways 30 are formed in the body member 14 to accommodate each jaw piece 16. Preferably, three jaw pieces 16 are employed and each jaw piece 16 is separated from the adjacent jaw piece by an arc of 120°. The axes of the passageways 30 and the jaw pieces 16 are angled with respect to the chuck axis but intersect the chuck axis at a common point ahead of the chuck body 14. Each jaw piece 16 has a tool engaging face 32 parallel to the axis of the chuck body 14 and threads 34 on its outer surface.

A circumferential groove 36 is formed in the body member 14 and extends into the passageways 30. A split nut 38 having female threads 40 is located in the circumferential groove 36 and secured therein by a collar 42. Impact dogs 44 are formed on the forward edge of the collar 42. It will be understood that the split nut 38 and the collar 42 are free to rotate as a unit with respect to the body member 14.

The sleeve 12 carries an impact ring 46 which has impact dogs 48 formed on its rearward edge which mate with the impact dogs 44 on the collar 42. The impact ring 46 may be press fitted or otherwise secured to the sleeve 12 so than an integral structure is formed. Similarly the collar 42 may be press fitted or otherwise secured to the split nut 38 so as to form an integral structure. The threads 40 of the split nut 38 mate with the threads 34 on the jaw pieces 16 so that rotation of the split nut 38 will drive the jaw pieces 16 along the passageways 30.

A compression spring 50 surrounds the tail section 22 of the body member 14 and biases the sleeve 12 in a rearward direction with respect to the body member 14 so that the impact dogs 48 associated with the sleeve member 12 are juxtaposed with the impact dogs 44.

In operation, the chuck body member 14 is driven by the drive shaft of the powered driver (not shown) which is threaded into the threaded bore 26. When the body member 14 is so driven, the jaw pieces 16 and the sleeve 12 rotate as a unit. However, when the sleeve 12 is restrained, for example, by being held by the hand of the operator, the body member 14 will rotate with respect to the split nut 38, and the jaw pieces 16 will move toward the axis of the chuck. As the contacting faces of the impact dogs 44 and 48 are disposed at an angle to the axis of the chuck body 14, an axial force will be developed which will drive the sleeve in a forward direction so as to disengage the dogs 44 and 48. When the dogs 44 and 48 disengage, the body 14 will rotate and the spring 50 will move the sleeve rearwardly so as to realign the dogs 44 and 48. It will thus be seen that a series of impacts will be produced automatically so long as the sleeve 12 is restrained. The sequential impacts produce a further tightening (or loosening) effect depending on the direction of rotation of the body 14.

FIG. 4 illustrates a first modification of the invention illustrated in FIGS. 2 and 3. Parts which are common to FIGS. 2 and 4 bear the same designators and their description will not be repeated. Modified parts are designated by the subscript "a."

As shown in FIG. 4, the compression spring 50a is relocated from a position surrounding the tail section 22 of the body member 14 to a location where it acts between the rear end of the collar 42a (which is affixed to the split nut 38a) and a shoulder formed on the sleeve 12a. However, despite the change in the location of the spring 50a, it functions to bias the impact dogs 44a and 48a toward each other. Thus, the chuck of FIG. 4 operates in the same manner as the chuck of FIG. 2.

FIG. 5 illustrates a second modification of the present invention. Parts which are common to FIGS. 2 and 5 bear the same designators and their description will not be repeated. Modified parts are designated by the subscript "b."

The split nut 38b is positioned in the circumferential groove 36b and maintained there by the collar 42b. The impact dogs 44b are formed on the split nut 38b rather than on the collar 42 as shown in FIG. 2 thereby permitting the impacts to be delivered directly to the nut. It will be understood that the chuck shown in FIG. 5 operates in the same manner as the chuck of FIG. 2.

FIG. 6 illustrates a third modification of the present invention. It will be understood that FIG. 6 represents a longitudinal section between the jaw pieces in order to show the modified biasing means. Parts identical to those in FIG. 2 bear the same designators while modified parts are designated by the subscript "c." As shown in FIG. 6, a plurality of pins 52 are mounted in the body member 14c parallel to the axis of the body member 14c. The pins 52 are spaced between the jaw pieces 16 so that the number of pins is the same as the number of jaw pieces. The pins 52 locate a plurality of compression springs 54 which bias the sleeve 12c rearwardly with respect to the body member 14c. The split nut 38c is similar to the split nut 38 and the collar 42c carrying the impact dogs 44c is similar to collar 42 in FIG. 2. Finally, impact ring 46c carrying impact dogs 48c is similar to impact ring 46 of FIG. 2. The operation of the chuck shown in FIG. 6 is the same as that of the chucks shown in FIGS. 2, 4 and 5.

FIG. 7 illustrates a fourth modification of the present invention. Parts which are common to FIGS. 2 and 7 are identified by the same designators while modified parts are designated by the subscript "d." This modification involves locating the compression spring 50d on the nose section 18d of the body member 14d so as to bias the sleeve 12d and the impact ring 46d which it carries in a forward direction. The collar 42d which secures the split nut 38d carries impact dogs 44d on its rear edge which are juxtaposed with the impact dogs 48d formed on the forward edge of the impact ring 46d. It will be understood that although the parts are oriented somewhat differently, the modification of the present invention illustrated in FIG. 7 operates in the same manner as the modifications of the invention shown in FIGS. 2, 4, 5 and 6.

FIG. 8 illustrates a fifth modification of the present invention. Parts which are common to FIGS. 2 and 8 are identified by the same designators while modified parts are designated by the subscript "e." Like the modification shown in FIG. 7, the fifth modification shown in FIG. 8 employs a biasing compression spring 50e located on the nose section 18e of the body member 14e. However, in this modification the compression spring 50e acts between a support ring 56 press fitted or otherwise affixed to the nose section 18e of the body member 14e and the impact ring 46e affixed to the sleeve 12e, thereby biasing the sleeve 12e in a rearward direction. It will be seen that impact ring 46e has impact dogs 48e formed on its rear edge in juxtaposition with the impact dogs 44e formed on the forward edge of the collar 42e which secures the split nut 38e in the circumferential groove 36e formed in the body member 14e. Thus, the modification of FIG. 8 operates in the same manner as the modifications shown in FIGS. 2, 4, 5, 6 and 7.

FIG. 9 illustrates a sixth modification of the present invention. Parts which are common to FIG. 2 and 9 are identified by the same designators while modified parts are designated by the subscript "f." The sixth modification shown in FIG. 9 is similar to the modification shown in FIG. 8 except that the support ring 56 shown in FIG. 8 is replaced by a snap ring 58 which seats in a circumferential groove 60 formed in the nose section 18f of the body member 14f and the forward end of the sleeve 12f is extended toward the snap ring 58 so as to enclose the compression spring 50f. It will be understood that the modification of the invention shown in FIG. 9 operates in the same manner as the modifications shown in FIGS. 2, 4, 5, 6, 7 and 8.

FIG. 10 illustrates a seventh modification of the present invention. Parts which are common to FIGS. 2 and 10 are identified by the same designators while modified parts are designated by the subscript "g." The seventh modification shown in FIG. 10 is similar to the modifications shown in FIG. 9 except that the snap ring 58 is replaced by a spacing collar 62 which is press fitted or otherwise attached to the nose section 18g of the body member 14g. The modification of the invention shown in FIG. 10 operates in the same manner as the modification shown in FIGS. 2, 4, 5, 6, 7, 8 and 9.

The terms and expressions which have been employed are used as terms of description and not of limitation and there is no intention in the use of such terms and expressions of excluding any equivalents of the features shown and described or portions thereof, but it is recognized that various modifications are possible within the scope of the invention claimed.

What is claimed is:

1. A chuck for use with a powered driver having a drive shaft comprising generally cylindrical body means including a body member having a nose section and a tail section and a circumferential groove formed therein intermediate said nose and tail sections, said tail section having an axial bore formed therein to mate with said drive shaft of said powered driver and said nose section having an axial bore formed therein and a plurality of angularly disposed passageways formed therethrough and intersecting said axial bore and said circumferential groove, a plurality of jaw pieces slidably positioned in each of said angularly disposed passageways, each of said jaw pieces having a jaw face formed on one side thereof and threads formed on the opposite side thereof, split nut means rotatable mounted in said circumferential groove and in engagement with said threads of said jaw pieces, said split nut means including a split nut, a collar surrounding and securing said split nut, and at least one first impact dog, sleeve means rotatably mounted on said body member, said sleeve means including an impact ring and at least one second impact dog and spring means interposed between said body means and said sleeve means and adapted to bias said second impact dog into juxtaposition with said first impact dog.

2. A chuck as described in claim 1 wherein said first impact dog is formed on said collar.

3. A chuck as described in claim 1 wherein said first impact dog is formed on said split nut.

4. A chuck as described in claim 2 or claim 3 and in which said spring means is a compression spring positioned on the tail section of said body member.

5. A chuck as described in claim 1 wherein the spring means comprise a plurality of compression springs disposed parallel to the axis of said body member.

6. A chuck as described in claim 5 wherein the body means comprise, in addition, a plurality of pins affixed to said body member and disposed parallel to the axis of said body member, each said pin located substantially coaxially with one of said plurality of compression springs.

7. A chuck as described in claim 1 in which said spring means is a compression spring positioned on the nose section of said body member.

8. A chuck as described in claim 1 in which said body means includes a support ring located on the nose section of said body means and said spring means is a compression spring positioned on the nose section of said body means between said support ring and said impact ring on said sleeve means.

9. A chuck as described in claim 8 in which the forward edge of said sleeve means is adjacent said support ring when said compression spring is in its extended position.

10. A chuck as described in claim 1 in which said body means includes a snap ring located on the nose section of said body means and said spring means is a compression spring positioned on the nose section of said body means between said snap ring and said impact ring on said sleeve means.

11. A chuck as described in claim 10 in which the forward edge of said sleeve means is adjacent said snap ring when said compression spring is in its extended position.

12. A chuck as described in claim 1 in which said body means includes a spacing collar located on the nose section of said body means and said spring means is a compression spring positioned on the nose section of said body means between said spacing collar and said impact ring on said sleeve means.

13. A chuck as described in claim 12 in which the forward edge of said sleeve means is adjacent said spacing collar when said compression spring is in its extended position.

14. A chuck for use with a powered driver having a drive shaft comprising generally cylindrical body means including a body member having a nose section and a tail section and a circumferential groove formed therein intermediate said nose and tail sections, said tail section having an axial bore formed therein to mate with said drive shaft of said powered driver and said nose section having an axial bore formed therein and a plurality of angularly disposed passageways formed therethrough and intersecting said axial bore and said circumferential groove, a plurality of jaw pieces slidably positioned in each of said angularly disposed passageways, each of said jaw pieces having a jaw face formed on one side thereof and threads formed on the opposite side thereof, split nut means rotatably mounted in said circumferential groove and in engagement with said threads of said jaw pieces, said split nut means including a split nut, a collar surrounding and securing said split nut, and at least one first impact dog, sleeve means rotatably mounted on said body member, said sleeve means including an impact ring and at least one second impact dog and spring means interposed between said split nut means and said sleeve means and adapted to bias said second impact dog into juxtaposition with said first impact dog.

15. A chuck as described in claim 14 wherein said first impact dog is formed on said collar.

16. A chuck as described in claim 14 wherein said first impact dog is formed on said split nut.

17. A chuck as described in claim 15 or claim 16 and in which said spring means is a compression spring.

* * * * *